United States Patent [19]

Bolon et al.

[11] 4,377,684

[45] Mar. 22, 1983

[54] DECOLORIZATION OF POLYCARBONATE RESINS

[75] Inventors: Donald A. Bolon; John E. Hallgren, both of Scotia, N.Y.

[73] Assignee: General Electric Company, Schenectady, N.Y.

[21] Appl. No.: 346,667

[22] Filed: Feb. 8, 1982

[51] Int. Cl.$^3$ .............................................. C08G 63/62
[52] U.S. Cl. .................................... 528/486; 528/196; 528/200; 528/481; 528/490
[58] Field of Search ............... 528/486, 481, 490, 196, 528/200

[56] References Cited

FOREIGN PATENT DOCUMENTS 55-147508 11/1980 Japan.

*Primary Examiner*—Harold D. Anderson
*Attorney, Agent, or Firm*—James Magee, Jr.; James C. Davis, Jr.

[57] ABSTRACT

Polycarbonate resins which have been polymerized employing titanates as polymerizing agents generally have characteristic undesirable color. Removal of this color is accomplished by treatment of the polycarbonate resin with a quantity of an organic acid anhydride, optionally employing a smaller amount of a mineral acid, in addition for lower temperature decolorization.

11 Claims, No Drawings

DECOLORIZATION OF POLYCARBONATE RESINS

BACKGROUND OF THE INVENTION

Several processes for the production of polycarbonate resins by transesterification reactions have been proposed. In these reactions, the catalyst employed is frequently a titanate ester, which is quite effective in catalyzing the reaction; however, residues from the titanate esters in the polycarbonate resin result in an obvious color in the resin.

Since commercially desirable polycarbonate resins are expected to be colorless, polycarbonate resins produced by the transesterification reaction employing titanate catalysts are at a disadvantage because of the color, regardless of the effectiveness or economy of the transesterification process. Accordingly, a method for effectively decolorizing such titanate catalyzed polycarbonate resins has been sought.

CROSS-REFERENCE TO RELATED APPLICATION

One transesterification reaction employing titanate ester catalysts is shown in copending application Ser. No. 325,879, Bolon et al, filed Nov. 30, 1981 and assigned to the same Assignee as the present invention. As pointed out in that disclosure, the titanate ester is an effective catalyst for formation of the polymer, but the resulting polymer does have an undesirable color. By reference, this application is made part of the disclosures of the instant application.

SUMMARY OF THE INVENTION

In accordance with the present invention, it has unexpectedly been discovered that the discoloration of a polycarbonate resin caused by the use of a titanate ester as a transesterification catalyst can be eliminated by treatment of the resin with an organic acid anhydride. The resulting oxytitanium salts are soluble in the resin and colorless. Thus, separation of the end product is not necessary, resulting in an extremely facile method of decolorizing.

Specifically, depending on its molecular weight and in the absence of a mineral acid, the polycarbonate resin can be heated with an organic acid anhydride to from about 250° C. to 325° C. The acid anhydride and titanate ester react according to the following equation using an aryl titanate as an example.

$$2Ti(OAr)_4 + 7(RCO)_2O \longrightarrow Ti_2O(O_2CR)_6 + 8RCO_2Ar, \quad (1)$$

where Ar is an aromatic group selected from the class consisting of phenyl, tolyl, xylyl,

etc. R is selected from the class consisting of $C_{1-20}$ alkyl radicals, e.g., methyl ethyl, propyl, butyl, hexyl, dodecyl, etc.; phenyl, tolyl, etc. Preferred are phthalic anhydride, substituted phthalic anhydrides, acetic anhydride, etc.

In addition, the acid anhydride represented by the formula $(RCO)_2O$ can be:

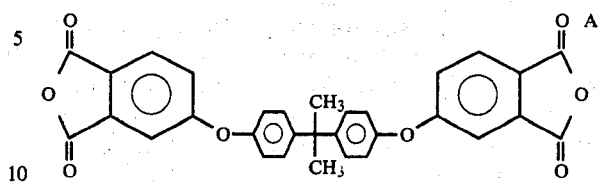

The treatment of the polycarbonate resin containing the titanate ester can be carried out with molten polycarbonate resin, at an elevated temperature, but below the temperatures at which the polycarbonate resin decomposes, generally from 250° to 325° C., in the absence of solvent, or the polycarbonate resin can be dissolved in a carbonate monomer (e.g., diphenyl carbonate, dimethyl carbonate, etc.) which constitutes one of the raw materials for its production, prior to separation of the polycarbonate resin from the carbonate.

While the acid anhydrides just described are extremely effective in reacting with the titanate and removing the undesirable color, even faster reactions can often be achieved by employing additionally a small quantity of a mineral acid, particularly phosphoric or sulfuric acids, e.g., from 0.001 to 0.5%, by weight, mineral acid per 100 parts, by weight, polymer. The use of the mineral acid permits the decolorization to take place rapidly at room temperature.

DESCRIPTION OF THE PREFERRED EMBODIMENTS

In one embodiment, a polycarbonate resin which has been made by transesterification or ester carbonate interchange using a titanate catalyst is decolorized by treating the molten resin, or while the resin is dissolved in a solvent of a monomeric carbonate, with an acid anhydride in the manner described above, so as to convert the color producing titanate ester to a colorless titanium compound, soluble in the polycarbonate resin.

Thus, the acid anhydride employed in the decolorization of polycarbonate resins in accordance with the present invention may be selected from the class consisting of acetic anhydride, propionic anhydride, benzoic anhydride, phthalic anhydride, chlorophthalic anhydrides, a dianhydride of formula A, etc.

In order to effect the decolorization of the polycarbonate resin, it is merely heated with the anhydride until it is molten, i.e., at least about 250° C. It may be heated as high as 325° C. in carrying out the decolorization process in accordance with the present invention. Preferably, the temperature is maintained between 275° C. and 300° C.

The polycarbonate resin may be treated in the absence of any solvent, or it may be treated before separation from the monomers from which the resin is formed. Thus, for example, the polycarbonate resin may be contained in a dimethyl or diphenyl carbonate monomer, where that monomer remains from the original reactants. The conditions of treatment remain the same.

While stirring the heated polycarbonate resin, a quantity of an acid anhydride, as described above, is added. Preferably, from the standpoint of cost and ease of reaction, the preferred anhydride is acetic anhydride or phthalic anhydride. The anhydride concentration should be stoichiometric, as far as the titanate ester is concerned, as illustrated in accordance with equation (1). A 5% stoichiometric excess of the acid anhydride is permitted, based upon the amount of titanate ester employed in the polymerization reaction.

Decolorization employing the acid anhydride, as just disclosed, is generally accomplished in about 2 to 5 minutes. Even faster decolorization can be obtained at much lower temperatures, however, by including with the acid anhydride a trace of a mineral acid, particularly phosphoric or sulfuric acid. The amount of mineral acid employed can be varied widely, and generally, about 10% of the stoichiometric amount of acid anhydride employed, though an amount up to stoichiometric equivalence is permissible. When the mineral acid is used in conjunction with the acid anhydride, decolorization is accomplished almost immediately at around room temperature (15° to 35° C.).

While the resin being treated for decolorization has a significant orange color prior to the treatment, it is colorless, at least by visual inspection, subsequent to the treatment. Further, resins decolorized in accordance with the present invention were investigated by ultra violet transmission at 350 to 400 nanometers and showed an optical density of 0.1 absorbance unit maximum.

The examples set forth below should not be considered as limiting, in any way, the full scope of the invention. All parts in the examples, unless otherwise indicated, are by weight.

EXAMPLE 1

A reaction vessel, equipped with a stainless steel stirrer, was charged with 5 parts of an intensely orange colored polycarbonate resin having a molecular weight of 102,000. The resin had been prepared via an ester-carbonate (dimethyl carbonate and bisphenol-A diacetate) interchange reaction with a tetraphenyl titanate catalyst in an amount of 72 ppm calculated at $TiO_2$. The reaction vessel was flushed with nitrogen and the contents then heated to 300° C. After the polycarbonate resin had melted, a quantity of 0.0024 part of phthalic anhydride was added, and stirring continued for 2 minutes. After the 2 minutes of stirring, the orange color had disappeared and the mixture was cooled to room temperature. The resulting resin was transparent and nearly colorless and virtually no change in molecular weight was observed. By gel permeation chromotography, the molecular weight of the decolorized material was 103,500.

EXAMPLE 2

Into a reaction vessel equipped with a stirrer was charged 15 parts of the polycarbonate resin employed in Example 1 dissolved in approximately 100 parts of dimethyl carbonate. To this was added 0.0048 part of acetic anhydride and 0.0001 part of phosphoric acid. Within a stirring time of 2 minutes at room temperature (e.g. from 15° to 35° C.), the orange color disappeared, and a colorless solution remained.

Results equivalent to those of Example 1 were obtained when phthalic anhydride was replaced by acetic anhydride, propionic anhydride, and

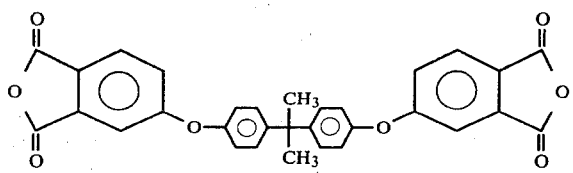

or when the phosphoric acid in Example 2 is replaced with sulfuric acid using acetic anhydride.

While specific examples of the invention have been shown and described, the invention should be considered only as limited by the appended claims.

What we claim and desire to secure by Letters Patent of the United States is:

1. A process for decolorizing a polycarbonate resin containing a titanate ester of formula $Ti(OAr)_4$, where Ar is an aryl group, comprising (1) reacting said titanate ester with at least a stoichiometric amount of an organic acid anhydride.

2. The process as in claim 1 where the acid anhydride is selected from the class consisting of acetic acid anhydride, propionic acid anhydride, phthalic acid anhydride, substituted phthalic acid anhydrides and

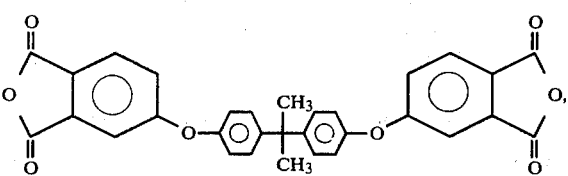

and (2) isolating the decolorized polycarbonate resin.

3. The process of claim 1 wherein the titanate ester is tetraphenyl titanate.

4. The process of claim 1 wherein the acid anhydride is acetic anhydride or phthalic anhydride.

5. The process of claim 1 wherein the temperature is from 275° to 300° C.

6. The process of claim 1 wherein the polycarbonate resin is dissolved in a carbonate monomer.

7. The process of claim 1 wherein the amount of acid anhydride added is from stoichiometric based upon the amount of titanate ester, to an excess of 5% excess, based on the stoichiometric amount of the titanate.

8. The process of claim 1 wherein an amount of a mineral acid of from 10% of the stoichiometric amount to the stoichiometric amount, based on the amount of acid anhydride, selected from the class consisting of phosphoric and sulfuric acids, is stirred with the polycarbonate resin and acid anhydride at around room temperature.

9. The process of claim 8 wherein the titanate ester is tetraphenyl titanate.

10. The process of claim 8 wherein the acid anhydride is acetic anhydride.

11. The process of claim 8 wherein the polycarbonate resin is dissolved in a carbonate monomer.

* * * * *